W. S. DAVIS.

BALE-TIE.

No. 7,252. Reissued Aug. 8, 1876.

Witnesses
John Becker.
Fred. Haynes

Walters S. Davis
by his Attorneys
Brown & Allen

N. PETERS, PHOTO-LITHOGRAPHER, WASHINGTON, D. C.

UNITED STATES PATENT OFFICE.

WATERS S. DAVIS, OF GALVESTON, TEXAS.

IMPROVEMENT IN BALE-TIES.

Specification forming part of Letters Patent No. 178,418, dated June 6, 1876; reissue No. 7,252, dated August 8, 1876; application filed July 22, 1876.

*To all whom it may concern:*

Be it known that I, WATERS S. DAVIS, of the city and county of Galveston, in the State of Texas, have invented a new and useful Improvement in Bale-Ties; and I do hereby declare that the following is a full, clear, and exact description of the same, reference being had to the accompanying drawing, which forms part of this specification.

This invention relates to ties for packages or bales of cotton, hemp, rags, or other substances in which a divided metallic band or hoop encircling the package or bale is used, and the ends whereof are joined by a hook at one end of said band, arranged to interlock with any one of a series of mortises in the other end of the band, for the purpose of binding or holding the package together. Various hook-and-mortise fastenings have been devised for this purpose, including not only different constructions of the hook, but also of the mortise in relation with the latter. Some of these differences, although apparently trifling in themselves, have greatly varied as regards their successful application, the principal object being to produce a bale-tie which combined simplicity with efficiency, both as regards its use in fastening or unfastening, in accommodating itself to different-sized packages or different compressions and elasticities of the packed material, and to different shocks or pressures liable to accidentally detach or open the fastenings. Some of these hooks have been simple or single pronged, and others double pronged, and in order to give security have not only required the mortises with which they engage to be of a less length than the hook, but have involved, in some cases, three different motions to engage and disengage them, and the fastening of the tie has been attended with considerable difficulty. Even when a single hook is used, constructed as described in Letters Patent No. 173,597, issued to me February 15, 1876, it is not always convenient to cant the hook, so as to effect its engagement with a mortise of less length than the hook on its face.

This invention consists in a peculiar construction of the hook, which is a single one, whereby it does not necessarily require to be canted to effect its engagement or disengagement, nor yet any multiplicity of motions for such purpose; but a single motion suffices, and the mortises may even be of the same or greater length than the face of the hook without endangering the disengaging of the latter, and the tie may be rapidly fastened and unfastened.

Figure 1:
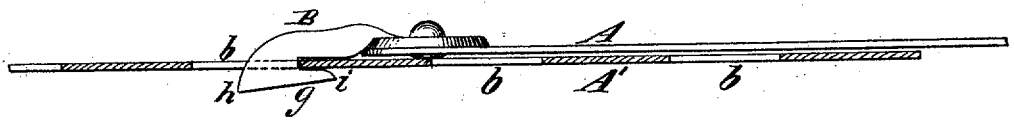
Figure 2:
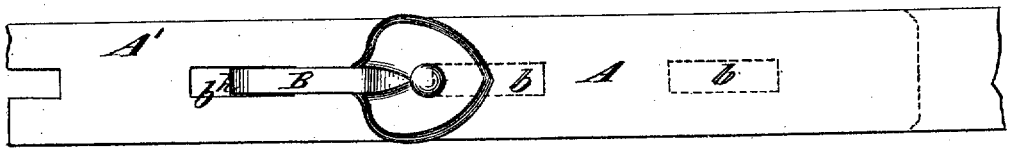
Figure 3:
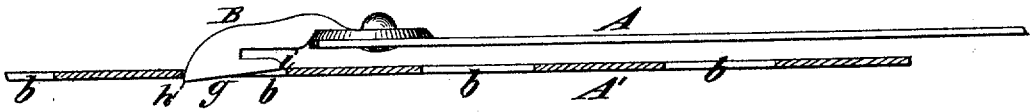

Figure 1 is a longitudinal edge view, in partial section, of the engaging ends of a bale-tie with my improved fastening applied, and as securing the ends of the band together. Fig. 2 is an outside face view of like parts under similar conditions; and Fig. 3, a longitudinal edge view, in partial section, of the same, showing the entry or detachment of the hook end of the band in relation with the mortise end thereof.

A is the one end of a metallic bale-band, having attached to it the hook B; and A′ is the other end of said band, having arranged in or along it a series of mortises, *b*, with either of which the hook B is designed to engage. Said mortises *b*, which it is preferred to make of an oblong form, may be arranged at any desired distances apart. The hook B may be of iron or other metal, and be riveted to the one end of the band. The forward or engaging portion of the hook B is of but little less width than either mortise *b*, through which it fits. The face or under surface *g* of such portion may be of the same, or even less, length than that of either mortise *b*, or, in other words, than the dimensions of the mortises in direction of the length of the band, and the curved portion or root *h* of the nose of the hook at the back end of the face *g* is made to project considerably below or beyond the opposite or nose end *i* of said face, so that if the face *g* be straight or flat it will have a dip or inclination downwardly or in an inward direction relatively to the planes of the overlapping end portions of the band, from the end *i* of the nose of said hook to the root *h* thereof, as clearly shown in Figs. 1 and 3.

By this construction of the hook, there is no necessity to cant it, or to give it first a forward, then a downward, and afterward a back motion to engage it with the mortise; but a single back motion suffices, the hook having previously dropped to its place within or through the mortise. A similar single reverse movement serves to disengage the hook when required.

In this operation of the hook the downwardly or inwardly projecting root end *h* of the hook at the back end of the dipping or inclined face *g* performs three important functions, thus: it acts as a guide for the entry of the hook within the mortise; also, more or less as a safeguard against any accidental disengagement of the hook by the sliding of the two ends of the band over the other, and as a guide for the hook at the back end of the mortise when purposely disengaging the two ends of the band.

I claim—

The single hook B, having its face *g* constructed to dip or incline downwardly or in an inward direction relative to the planes of the overlapping end portions of the band, from the end *i* of the nose of said hook to the root *h* thereof, for operation in connection with the mortises *b* in the bale-band, substantially as described.

WATERS S. DAVIS.

Witnesses:
HENRY T. BROWN,
MICHAEL RYAN.